Oct. 16, 1962 C. H. HEUER 3,059,140

COLOR TELEVISION RECEIVER COLOR BALANCE CONTROL

Filed July 16, 1957 2 Sheets-Sheet 1

Inventor
Charles H. Heuer
By John J. Pederson
Attorney

Inventor
Charles H. Heuer
By John J. Pederson
Attorney 3,059,140
Patented Oct. 16, 1962

3,059,140

COLOR TELEVISION RECEIVER COLOR BALANCE CONTROL

Charles H. Heuer, Glencoe, Ill., assignor to Zenith Radio Corporation, a corporation of Delaware Filed July 16, 1957, Ser. No. 672,233
10 Claims. (Cl. 315—13)

This invention relates to a new and improved color television receiver; more particularly, the invention relates to a color television receiver in which color balance is maintained without requiring the use of a voltage regulator in the high voltage power supply.

Most present day color television receivers employ an image-reproducing device of the cathode-ray type with a tri-color phosphor screen and a color-selection barrier or shadow-mask which cooperates with an appropriate electron gun assembly to restrict the access of three separate electron beam components to the appropriate portions of the tri-color phosphor screen. In accordance with conventional practice, each of the electron guns comprises a cathode, a control grid and a screen electrode or so-called first anode, and the tube is provided with a common focus electrode followed by a final anode which ordinarily takes the form of an internal conductive coating on the wall of the envelope. In many receivers, the cathode and control grid elements of the several electron guns must be operated at a D.-C. voltage level substantially above ground and this requires that the screen electrodes or first anodes be maintained at D.-C. potentials substantially above the D.-C. voltage of the receiver power supply, usually in the order of 400 or 500 volts. Receivers of this type are generally provided with boot-strap power supply circuits for providing so-called boosted B-voltage which may be in the range of about 800 volts and which is employed to provide the anode voltage for the sweep output stages. This boost voltage is also a convenient source of required first anode voltage for the electron guns of the color image reproducing device. So long as the B-boost voltage is maintained stable, satisfactory operation in this manner can be achieved. For this purpose, as well as to maintain the final anode voltage for the picture tube substantially constant, most present-day color television receivers are provided with regulated high-voltage power supplies.

If it is attempted to eliminate the high-voltage regulator, for the purpose of receiver economy and simplification, variations in average picture brightness which result from changes in the picture content lead to rather severe fluctuations in the final anode voltage and, since the B-boost voltage is derived from the high-voltage power supply, in the voltages applied to the screen electrodes or first anodes of the three electron guns. Because of the differences in the efficiences of commercially employed color phosphors, it is necessary to operate the three electron guns with different average beam currents in order to provide color balance in the reproduced image, and also to provide faithful reproduction of monochrome images during reception of ordinary black-and-white signals. Unfortunately, however, equal percentage variations in first anode voltages lead to widely different changes in average beam currents in the three electron guns so that variations in the B-boost voltage attributable to changes in picture content lead to disproportionate variations in the average beam currents. This manifests itself most noticeably in the form of extraneous color content on monochrome reproduction and also leads to a disturbance in the primary color balance during reception of color broadcasts.

It is a principal object of the present invention to provide a new and improved color television receiver of the type employing an unregulated high-voltage supply.

It is a more specific object of the invention to provide a color television receiver of the type employing an unregulated high-voltage supply, in which improved fidelity of both monochrome and color image reproduction is achieved.

It is another object of the invention to provide a color television receiver of the type employing an unregulated high-voltage supply in which variation of the final anode voltage and the B-boost voltage as a function of average picture brightness does not substantially affect the color balance of the reproduced image, either during monochrome or color reception.

A color television receiver constructed in accordance with the invention comprises a color image reproducer including a color image target comprising a plurality of color phosphors of substantially different efficiencies. The image reproducer further comprises a corresponding plurality of electron guns individually associated with the phosphors and an anode which is common to all of the guns. For example, the color image reproducer may comprise a conventional tri-color shadow mask picture tube. The receiver further comprises a high voltage power supply which is electrically connected to the image reproducer anode and which exhibits substantial variations in potential in response to changes in brightness of the image reproduced at the target. Finally, the receiver includes a corresponding plurality of biasing circuits coupled to respective corresponding electrodes of the guns and responsive to the changes in picture brightness to effect variations between the potentials on the electrodes unequal in amount by a percentage maintaining a predetermined color balance in the reproduced picture. In a highly satisfactory form of the invention, the receiver includes an additional low voltage power supply, normally called B-boost, which derives energy from the high voltage supply in a conventional manner and exhibits corresponding variations in potential with changes in picture brightness. This receiver affords a biasing circuit to the screen electrode of each electron gun and a corresponding plurality of sources of different stable reference potentials. Each of these biasing circuits is electrically connected to the B-boost voltage power supply of the receiver and to respective ones of the corresponding screen electrodes and the three reference sources to afford unequal percentage variations in the operating potentials of the screen electrodes in response to changes in overall picture brightness and thereby maintain the predetermined color balance in the reproduced picture.

Other and further objects of the present invention will be apparent from the following description and claims and are illustrated in the accompanying drawings which, by way of illustration, show a preferred embodiment of the present invention and the principles thereof and what is now considered to be the best mode for applying those principles. Other embodiments of the invention embodying the same or equivalent principles may be used and structural changes may be made as desired by those skilled in the art without departing from the present invention.

Figure 1:
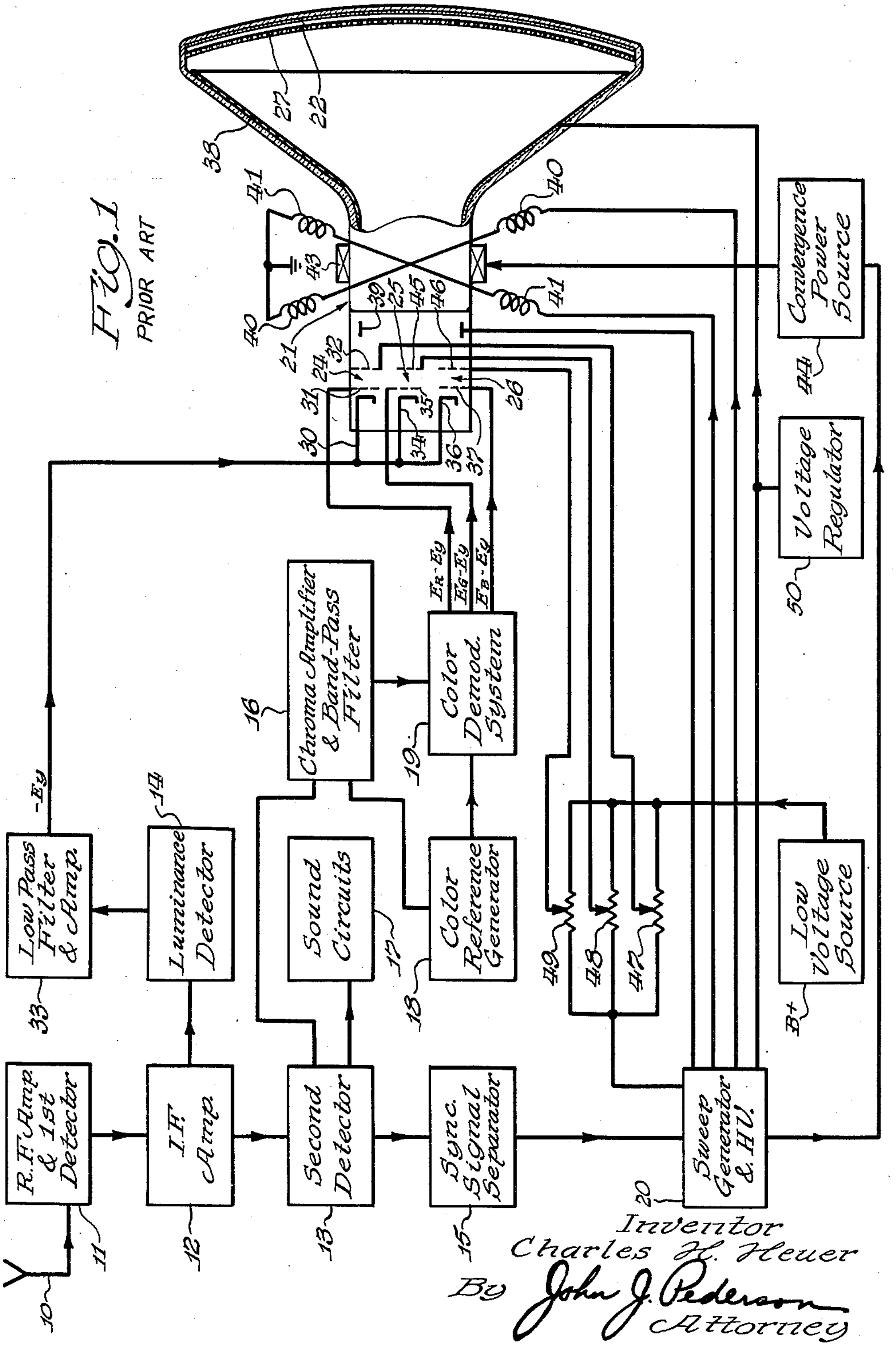
Fig. 1 PRIOR ART
FIGURE 1 is a block diagram of a conventional color television receiver.

The conventional color television receiver schematically illustrated in FIGURE 1 includes an antenna 10 coupled to a radio-frequency amplifier and first detector 11, which in turn is coupled to an intermediate-frequency amplifier 12. The output of intermediate-frequency amplifier 12 is coupled to a second detector 13 and to a luminance detector 14. The second detector 13, in turn, is coupled to a synchronizing-signal separator 15, to a band-pass filter 16, and to a sound circuit unit 17. The sound circuit unit 17 may include the usual frequency discriminator, audio amplifier, speaker, and other stages normally employed in this portion of a television receiver. Chroma amplifier and band-pass filter 16 is coupled to a color-reference signal generator 18 which is utilized to supply a color-reference signal to a color demodulating system 19; the color demodulating system is also coupled to the output of the band-pass filter 16. Synchronizing-signal separator 15 is coupled to a conventional sweep generator and high voltage circuit 20. Sweep generator and high voltage circuit 20 may include, for example, the usual horizontal frequency oscillator, horizontal discharge device, horizontal output tube, damper, and sweep transformer as well as a vertical frequency oscillator and vertical output device. The high voltage portion of circuit 20 includes the usual rectifier coupled to the horizontal sweep transformer to rectify the flyback pulses developed in that transformer and generate a relatively high positive potential of the order of 20–25 kilovolts or higher. A focus rectifier supplies focus voltage for the display device. Rectification of the flyback pulse by the damper supplies a B-boost voltage of the order of 800 volts.

The color television receiver of FIGURE 1 also includes a color image reproducer 21 which comprises a conventional shadow mask picture tube having a tricolor image screen or target 22 bombarded by electron beams from three individual electron guns 24, 25, and 26. A parallax mask 27 is included in the image reproducer 21 and is utilized to restrict the electron beams generated by the three guns 24–26, in known manner, so that each beam can impinge upon only one color phosphor in the image target 22. In the ensuing description of the receiver of FIGURE 1, it is assumed that electron guns 24, 25 and 26 comprise the "red," "green," and "blue" guns respectively of the image reproducer. The electron gun 24 includes a cathode 30, a control electrode 31, and a screen electrode 32. Cathode 30 is coupled through a low pass filter and amplifier 33 to the luminance detector 14 of the receiver, whereas control electrode 31 is coupled to the color demodulating system 19. Similarly, the cathode 34 of the "green" gun 25 is connected to amplifier 33 and the control electrode 35 of this gun is connected to demodulating system 19. The cathode 36 and control electrode 37 of the "blue" gun 26 are also coupled to amplifier 33 and demodulating system 19 respectively. The three guns of the color picture tube are provided with a common final anode 38 which is electrically connected to the high voltage supply incorporated in circuit 20; in accordance with customary practice, anode 38 may be electrically connected to mask 27 and to a conductive backing film on color target 22. A focus electrode 39 common to all three electron guns 24–26 is coupled to the focus voltage rectifier of unit 20. Two pair of conventional deflection coils 40 and 41 are shown for the picture tube and are driven by suitable scanning signals from sweep generator 20. In addition, the color picture tube may be provided with a convergence device 43 energized from a suitable power source 44 which may be derived from sweep generator unit 20.

In accordance with conventional practice, the screen electrodes 32, 45, and 46 of guns 24, 25, and 26 respectively are all connected to substantially similar biasing circuits. Thus, screen electrode 46 is connected to the variable tap on a potentiometer 49 which is electrically connected between a stable low voltage source B+ and the sweep generator 20. The connection to sweep generator 20 is made to the usual auxiliary low-voltage supply incorporated in the sweep generator and customarily designated as the "B boost" circuit. Screen electrode 45 is similarly connected to a potentiometer 48 and screen electrode 32 is connected to a potentiometer 47, the potentiometers 48 and 49 being connected between the low voltage source B+ and the B boost portion of sweep generator 20. Moreover, in this conventional receiver, a voltage regulator 50 is connected to the high voltage supply circuit of sweep generator 20 to afford a regulated operating potential for the final anode 38 of the picture tube.

Inasmuch as the operation of the conventional color recever illustrated in FIGURE 1 is well understood in the art, only a relatively brief description thereof need be included therein. A received color telecast intercepted by antenna 10 is detected and amplified in circuit 11, is further amplified in the intermediate-frequency amplifier 12, and is applied to the second detector 13 and the luminance detector 14. The output signal from luminance detector 14 is supplied to amplifier 33 to develop a luminance signal, conventionally designated as $E_Y$, which is applied to the cathodes 30, 34, and 36 of electron guns 24, 25 and 26 respectively. The output signal from second detector 13, on the other hand, drives the sound circuits 17 in known manner to reproduce the audio portion of the telecast and is also supplied to color demodulating system 19 through band-pass filter 16. The color sync signal included in the received telecast is utilized in color reference generator 18 to control the operation of a color-reference oscillator, the color-reference signal developed by the oscillator being applied to color demodulating system 19. Demodulating system 19 develops three individual color difference signals $E_R—E_Y$, $E_G—E_Y$, and $E_B—E_Y$, which are supplied to control electrodes 31, 35, and 37 respectively to control the beam current developed by the "red," "green" and "blue" guns 24, 25, and 26. Any of the many known color demodulating systems may be employed in the receiver, a preferred color demodulating system being described and claimed in United States Patent No. 2,779,-818 of Robert Adler and John L. Rennick, issued January 29, 1957, and assigned to the same assignee as the present application.

The horizontal and vertical frequency synchronizing components of the received telecast are supplied from sync separator 15 to sweep generator 20 to control the usual vertical- and horizontal-frequency sweep circuits. The scanning signals developed in the sweep generator are applied to the deflection yoke of the picture tube, represented by coils 40 and 41, to deflect the three electron beams from guns 24, 25, and 26 across target electrode 22 and develop the usual image raster thereon. Convergence of the three beams approximately at color target 22 is effected by suitable signals applied to the convergence device 43 from source 44, which may constitute a dynamic convergene circuit of known construction.

The voltage regulator 50 of the conventional circuit of FIGURE 1 prevents substantial fluctuations in the anode voltage of the color picture tube 21 with changes in picture brightness. Voltage regulators capable of operation at the relatively high anode potentials required for most picture tubes, however, are quite expensive. Moreover, these voltage regulators are not especially desirable from the standpoint of longevity and tend to contribute substantially to the maintenance cost of the receiver over extended periods of operation. Consequently, it is highly desirable to eliminate this portion of the receiver completely in order to reduce the manufacturing and maintenance costs; on the other hand, as indicated hereinabove, omission of the voltage regulator introduces certain operational effects which are highly undesirable, among which is a noticeable disturbance in the color balance of the image reproduced at the color target 22.

Figure 2:
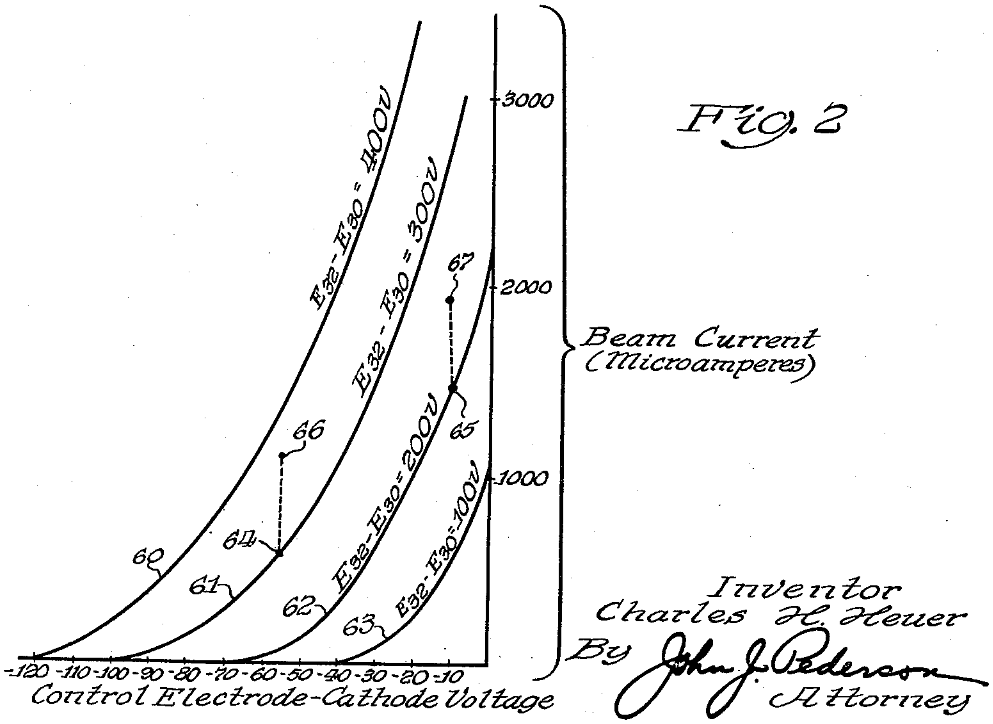
FIGURE 2 is a graphical representation of certain operating characteristics of the image reproducer included in the receiver of FIGURE 1.

The effect of variations in final anode potential upon the color balance in the image reproduced by picture tube 21 may best be understood by reference to FIGURE 2, in which beam current from the indicidual electron guns 24–26 is plotted as a function of control electrode-cathode voltage in the guns for several different values of screen electrode-cathode voltage. Thus, FIGURE 2 includes four different plots 60, 61, 62 and 63 for screen electrode voltages of 400, 300, 200, and 100 volts respectively. In FIGURE 2, these four different curves are correlated with the potential difference between screen electrode 32 and cathode 30 in electron gun 24, but are equally applicable to the corresponding electrodes of guns 25 and 26.

Point 64 on curve 61 represents one possible normal operating point for the "blue" gun 26 for monochrome reproduction. Point 65 on curve 62 represents a typical corresponding operating point for the "red" gun 24. These operating points are based on a typical ratio of phosphor efficiencies of 0.4:1 for the red and blue phosphors in the picture tube. It should be noted that the "blue" beam current is less than one-half the "red" beam current; actually, in a typical tube adjusted for good white reproduction, $I_B$, the "blue" current, may be approximately $0.4I_R$ (the "red" current) for these typical phosphors.

If the screen electrode potentials of the two electron guns 24 and 26 are each increased by 20%, the beam currents may be represented by points 66 and 67 in FIGURE 2. Under these circumstances, $I_B=0.53I_R$. Consequently, the picture developed on the target electrode of the tube is much bluer than before. Similarly, if the screen electrode potentials of the two guns are decreased by equal percentages, the picture becomes redder in cast. These changes in overall color value are highly undesirable, since they are produced directly by variations in picture brightness and are not caused in response to color changes in the transmitted signal. Accordingly, a monochrome picture reproduced by picture tube 21, with voltage regulator 50 eliminated, will assume different coloring at different times solely on the basis of changes in the average brightness thereof. Expressed differently, equal percentage changes in the screen voltages of the three guns represent radically different fractional changes in beam current in the guns. As a first order approximation, in fact, the absolute magnitude of the beam current change is substantially dependent upon the percentage change in screen electrode potential.

These undesirable variations in color balance, which are particularly noticeable in the reproduction of monochrome images, may be compensated in accordance with the invention by a circuit which causes the screen electrode potentials to vary in proportion to the individual electron gun beam currents of the nominal tube. Thus, if it is assumed that a 20% change is to be effected in the potential of the "red" screen electrode 32, then only an 8% change should be effected in the potential of the "blue" screen electrode 46. Moreover, the variations in screen electrode voltage for the "green" gun 25 should be intermediate those for guns 24 and 26 in order to maintain the desired color balance, since in the nominal picture tube the relative efficiency of the green phosphor is intermediate those of the red and blue phosphors.

Figure 3:
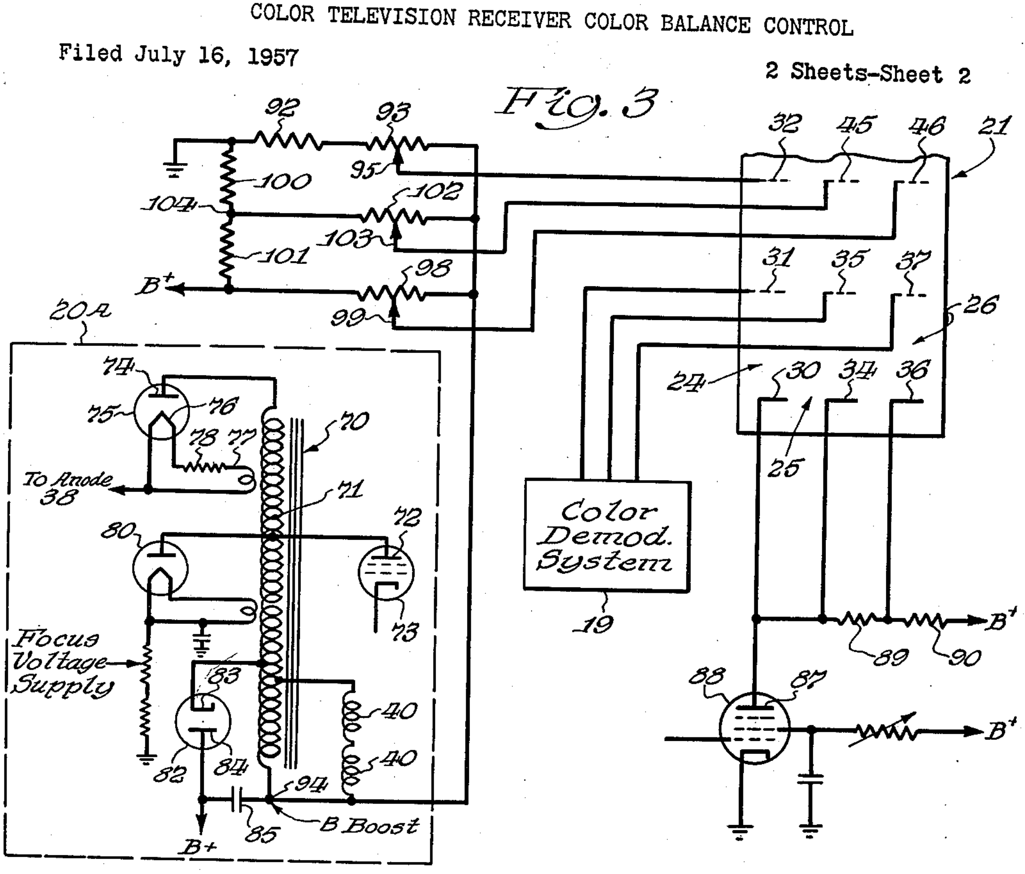
FIGURE 3 is a detailed schematic diagram showing a preferred embodiment of the invention.

The circuit illustrated in FIGURE 3, which comprises a preferred embodiment of the invention, effectively maintains color balance in the receiver of FIGURE 1 when the voltage regulator 50 is omitted therefrom, despite the fact that the anode operating potential, and hence the B-boost potential, developed in sweep generator 20 may vary over a substantial range with changes in average picture brightness. The circuit illustrated in FIGURE 3 comprises a portion 20A of sweep generator unit 20 including a conventional sweep autotransformer 70 having a winding 71 connected in conventional manner at an intermediate point thereon to the anode 72 of the usual horizontal output tube 73. The anode 74 of a rectifier diode 75 is connected to one end of the winding 70. The filamentary cathode 76 of the diode is coupled to winding 71 by means of a winding 77, a resistor 78 being connected in series with the cathode and winding 77. Cathode 76 of diode 75 is also connected to anode 38 of color picture tube 21 (see FIGURE 1). Thus, the diode 75 is arranged in a conventional high voltage supply circuit for the color picture tube. A second rectifier diode 80 may also be coupled to the sweep transformer 70 in a manner essentially similar to diode 75 to provide a source of operating potential for the focus electrode of the color picture tube; this portion of the image reproducer and sweep generator form no part of the present invention.

The horizontal sweep transformer and voltage supply circuit 20A further includes a damper diode 82 having a cathode 83 connected to an intermediate point on the transformer winding 71 and further having an anode 84 which is returned to the B+ low voltage supply of the receiver. A by-pass capacitor 85 is coupled to anode 84 of the damper diode and to the low end of transformer winding 71. The horizontal deflection yoke of the receiver, represented by the coils 40, is connected to the sweep autotransformer in conventional manner.

FIGURE 3 also shows schematically the neck section of color image reproducer 21, including the three electron guns 24, 25, and 26. The control electrodes 31, 35, and 37 of the three guns are coupled to color demodulating system 19 as described hereinabove. Cathodes 30 and 34 of guns 24 and 25 are connected to the anode 87 of a luminance amplifier tube 88 and cathode 36 of gun 26 is connected to the luminance amplifier anode by means of a resistor 89, the cathodes being returned to B+ through a resistor 90. The particular circuits employed to control the color and luminance values in the reproduced image are not critical and any circuit arrangement suitable for this purpose may be employed without affecting the invention; the circuits illustrated in FIGURE 3 are intended solely as an illustration of a typical coupling arrangement.

In accordance with the invention, three separate biasing circuits are provided for the screen electrodes 32, 45, and 46 of electron guns 24, 25, and 26. The biasing or operating potential circuit for screen electrode 32 of the "red" gun 24 comprises a resistor 92 and a potentiometer 93 connected in series with each other between ground and the terminal 94 of sweep transformer winding 71. It will be recognized that a D.C. potential is developed at terminal 94 which is substantially higher than the B+ potential of the receiver, this potential representing the sum of the B+ potential and the rectified voltage developed across the damper tube 82. Conventionally, this potential is referred to as the "B boost" potential of the receiver. Screen electrode 32 is connected to the variable tap 95 of potentiometer 93.

Screen electrode 46 of the "blue" electron gun 26 is provided with a biasing circuit comprising a potentiometer 98 connected between the B+ supply of the receiver and the "B boost" terminal 94. Screen electrode 46 is connected to the variable tap 99 of potentiometer 98.

The biasing circuit for the screen electrode of the "green" gun 25 includes a voltage divider including a pair of resistors 100 and 101 connected between the B+ supply of the receiver and ground. A potentiometer 102 is connected between this voltage divider and the B-boost supply terminal 94, the variable tap 103 on the potentiometer being connected to screen electrode 45.

The receiver circuit illustrated in FIGURE 3 thus comprises means affording sources of three different stable reference potentials represented by ground, the B+ supply of the receiver, and the intermediate reference potential terminal 104 of the voltage divider 100, 101. In addition, the receiver includes a low voltage power supply, the "B boost' circuit of the receiver, which is coupled to the high voltage power supply of the receiver. This low voltage power supply, the "B boost" circuit, varies in potential with variations in the high voltage supply potential; consequently, in a receiver with an unregulated high voltage supply in which the high voltage changes with variations in picture brightness, the operating potential of the "B boost" supply exhibits corresponding variations with changes in picture brightness.

The effect of the three independent biasing circuits upon operation of the color image reproducer may perhaps best be understood by reference to the following table, which sets forth the potentials on certain of the electrodes of the picture tube under two different operating conditions. One group of values are for an arbitrarily selected normal picture tube brightness, the other values being for a substantially brighter picture.

| Measured Potential | Normal | Bright | Percent Change |
|---|---|---|---|
| B Boost | 800 | 750 | 6.3 |
| B+ | 370 | 365 | 1.3 |
| $V_{32}$-$V_{30}$ | 140 | 118 | 15.7 |
| $V_{45}$-$V_{34}$ | 155 | 136 | 12 |
| $V_{46}$-$V_{36}$ | 195 | 180 | 7.7 |

It is thus seen that the circuit of FIGURE 3 affords an unequal percentage variation of the screen electrode potentials with changes in overall picture brightness. In this manner, the color balance in the reproduced picture initially determined by adjustment of the potentiometer taps 95, 99 and 103 may be maintained substantially constant despite large variations in overall picture brightness in a receiver in which the high voltage power supply is unregulated. The biasing circuits require virtually no increase in cost in construction of the receiver as compared with the conventional arrangement described hereinabove in connection with FIGURE 1, yet permit omission of voltage regulator 50 without sacrificing color balance in the reproduced image. It will of course be recognized that the particular selection of stable reference voltages to which the individual biasing circuits are returned is determined by the relative efficiencies of the color phosphors in the image reproducer and may require substantial variation if the efficiencies of these phosphors are changed substantially. The basic inventive concept, however, is applicable to any image reproducer in which the efficiencies of the color phosphors are substantially different from each other, regardless of which particular phosphors are the most efficient.

The invention has been described with relation to its embodiment in a receiver employing a tri-color shadow-mask color image reproducing device employing three primary-color phosphors of substantially different efficiencies. However, the principles of the present invention are equally applicable in receivers in which two-color reproduction is achieved, employing orange and cyan phosphors of different efficiencies for example. Moreover, the invention may also be embodied in a tricolor receiver in which two of the three primary-color phosphors are of substantially equal efficiency, in which event only two biasing circuits for the screen electrodes of the respective electron guns are required. Accordingly, it will be appreciated that the essence of the invention resides in the provision of separate first anode biasing circuits for electron guns assoicated with color phosphors of different efficiencies, without regard to the number of electron guns and color phosphors employed.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A color television receiver comprising: a color image reproducer comprising a color image target including a plurality of color phosphors of substantially different efficiencies, a corresponding plurality of electron guns individually associated with said phosphors, and an anode common to all of said guns; a high-voltage power supply electrically connected to said anode and exhibiting substantial variations in potential in response to changes in picture brightness at said target; a low-voltage power supply deriving energy from said high-voltage supply and exhibiting corresponding variations in potential with changes in picture brightness; means affording a corresponding plurality of sources of different stable reference potentials; and a corresponding plurality of biasing circuits, coupled to respective corresponding electrodes of said guns and electrically connected between said low-voltage power supply and respective ones of said reference sources, to effect variations between the potentials on said electrodes unequal in amount by a percentage maintaining a predetermined color balance in the reproduced picture in response to overall changes of said picture brightness.

2. A color television receiver comprising: a color image reproducer comprising a color image target including a plurality of color phosphors of substantially different efficiencies, a corresponding plurality of electron guns individually associated with said phosphors and each including a cathode, a control electrode and a screen electrode, and an anode common to all of said guns; a high-voltage power supply electrically connected to said anode and exhibiting substantial variations in potential in response to changes in picture brightness at said target; a low-voltage power supply deriving energy from said high-voltage supply and exhibiting corresponding variations in potential with changes in picture brightness; means affording a corresponding plurality of sources of different stable reference potentials; and a corresponding plurality of biasing circuits, coupled to respective ones of said screen electrodes and electrically connected between said low-voltage power supply and respective ones of said reference sources, to effect variations between the potentials on said screen electrodes unequal in amount by a percentage maintaining a predetermined color balance in the reproduced picture in response to overall changes of said picture brightness.

3. A color television receiver comprising: a color image reproducer comprising a color image target including a plurality of color phosphors of substantially different efficiencies, a corresponding plurality of electron guns individually associated with said phosphors and each including a cathode, a control electrode and a screen electrode, and an anode common to all of said guns; means affording a corresponding plurality of sources of different stable reference potentials; a high-voltage power supply electrically connected to said anode and exhibiting substantial variations in potential in response to changes in picture brightness at said target; a low-voltage power supply deriving energy from said high-voltage supply and exhibiting corresponding variations in potential with changes in picture brightness; and a corresponding plurality of biasing circuits, coupled to respective ones of said screen electrodes and each comprising a voltage divider connected between said low-voltage power supply and a respective one of said stable reference sources, to effect variations between the potentials on said screen electrodes unequal in amount by a percentage maintaining a predetermined color balance in the reproduced picture in response to overall changes of said picture brightness.

4. A color television receiver comprising: a color image reproducer comprising a tri-color image target including three color phosphors of substantially different efficencies, three electron guns individually associated with said phosphors and each including a cathode, a control electrode and a screen electrode, and an anode common to all of said guns; a high-voltage power supply electrically connected to said anode and exhibiting substantial variations in potential in response to changes in picture brightness at said target; a low-voltage power supply deriving energy from said high-voltage supply and exhibiting corresponding variations in potential with changes in picture brightness; means affording three sources of different stable reference potentials; and three biasing circuits, coupled to respective ones of said screen electrodes and each comprising a voltage divider connected between said low-voltage power supply and a respective one of said stable reference sources, to effect variations between the potentials on said screen electrodes unequal in amount by a percentage maintaining a predetermined color balance in the reproduced picture in response to overall changes of said picture brightness.

5. A color television receiver comprising: a color image reproducer comprising a tri-color image target including a first color phosphor of relatively high efficiency, a second color phosphor of relatively low efficiency and a third color phosphor of intermediate efficiency, first, second and third electron guns individually associated with said first, second and third phosphors respectively and each including a cathode, a control electrode and a screen electrode, and an anode common to all of said guns; a high-voltage power supply electrically connected to said anode and exhibiting substantial variations in potential in response to changes in picture brightness; a low-voltage power supply deriving energy from said high-voltage supply and exhibiting corresponding variations in potential with changes in picture brightness; means affording first, second and third stable reference potential sources, the first reference potential being positive with respect to the second and the second reference potential being positive with respect to the third; and first, second and third biasing circuits, coupled to respective ones of said screen electrodes and each comprising a voltage divider connected between said low-voltage power supply and the corresponding one of said stable reference sources, to effect variations between the potentials on said screen electrodes unequal in amount by a percentage maintaining a predetermined color balance in the reproduced picture in response to overall changes in said picture brightness.

6. A color television receiver comprising: a color image reproducer comprising a tri-color image target including three color phosphors of substantially different efficiencies, three electron guns individually associated with said phosphors and each including a cathode, a control electrode and a screen electrode, and an anode common to all of said guns; an unregulated high voltage power supply electrically connected to said anode and exhibiting substantial variations in potential in response to changes in picture brightness; a low-voltage power supply coupled to said high-voltage supply and exhibiting corresponding variations in potential with changes in picture brightness; a source of positive-polarity reference potential; a voltage divider connected between said reference source and ground to afford a second source of positive polarity reference potential; and three biasing circuits, coupled to respective ones of said screen electrodes and two of said circuits each comprising a voltage divider connected between said low-voltage power supply and a respective one of said stable reference sources and the third comprising a voltage divider connected between said low-voltage power supply and ground, to effect variations between the potentials on said screen electrodes unequal in amount by a percentage maintaining a predetermined color balance in the reproduced picture in response to overall changes of said picture brightness.

7. A color television receiver comprising: a color image reproducer comprising a color image target including three color phosphors of substantially different efficiencies, three electron guns individually associated with said phosphors, and an anode common to all of said guns; a high-voltage power supply electrically connected to said anode and exhibiting substantial variations in potential in response to changes in picture brightness at said target; a low-voltage power supply deriving energy from said high-voltage supply and exhibiting corresponding variations in potential with changes in picture brightness; a source of positive-polarity reference potential; a voltage divider connected between said reference source and ground to afford a second source of positive polarity reference potential; and three biasing circuits, coupled to respective corresponding electrodes of said guns and two of said biasing circuits being electrically connected between said low-voltage power supply and respective ones of said reference sources and the third biasing circuit being electrically connected between said low-voltage power supply and ground, to effect variations between the potentials on said electrodes unequal in amount by a percentage maintaining a predetermined color balance in the reproduced picture in response to overall changes in said picture brightness.

8. A color television receiver comprising: a color image reproducer having a color image target including a plurality of color phosphors of substantially different efficiencies, a corresponding plurality of electron guns individually associated with said phosphors, and an anode common to all of said guns; a high voltage power supply electrically connected to said anode and exhibiting substantial variations in potential in response to changes in picture brightness at said target; and a corresponding plurality of biasing circuits coupled to respective corresponding electrodes of said guns and responsive to said changes in picture brightness to effect variations between the potentials on said electrodes unequal in amount by a percentage maintaining a predetermined color balance in the reproduced color picture.

9. A color television receiver comprising: a color image reproducer having a color image target including a plurality of color phosphors of substantially different efficiencies, a corresponding plurality of electron guns individually associated with said phosphors and each including a cathode, a control electrode and a screen electrode, and an anode common to all of said guns; a high voltage power supply electrically connected to said anode and exhibiting substantial variations in potential in response to changes in picture brightness at said target; and a corresponding plurality of biasing circuits coupled to respective ones of said screen electrodes and responsive to said changes in picture brightness to effect variations between the potentials on said screen electrodes unequal in amount by a percentage maintaining a predetermined color balance in the reproduced picture.

10. A color television receiver comprising: a color image reproducer having a color image target including a plurality of color phosphors of substantially different efficiencies, a corresponding plurality of electron guns individually associated with said phosphors, and an anode common to all of said guns; a high voltage power supply electrically connected to said anode and exhibiting substantial variations in potential in response to changes in picture brightness at said target; a low voltage power supply deriving energy from said high voltage supply and exhibiting corresponding variations in potential with said changes in picture brightness; and a corresponding plurality of biasing circuits, deriving energy from said low voltage power supply and coupled to respective corresponding electrodes of said guns, responsive to said variations in low voltage power supply potential to effect variations between the potentials on said electrodes unequal in amount by a percentage maintaining a predetermined color balance in the reproduced picture.

References Cited in the file of this patent

UNITED STATES PATENTS

| | | |
|---|---|---|
| 2,722,563 | Loughlin | Nov. 1, 1955 |
| 2,745,899 | Maher | May 15, 1956 |
| 2,810,013 | Lubcke | Oct. 15, 1957 |
| 2,845,573 | Macovski | July 29, 1958 |
| 2,851,517 | Loughlin | Sept. 9, 1958 |